United States Patent [19]

Walters, Jr.

[11] 4,383,546

[45] May 17, 1983

[54] HIGH TEMPERATURE, HIGH PRESSURE VALVE

[75] Inventor: Thomas Walters, Jr., Primos, Pa.

[73] Assignee: Ecolaire Incorporated, Malvern, Pa.

[21] Appl. No.: 211,878

[22] Filed: Dec. 1, 1980

[51] Int. Cl.³ .................. B08B 3/04; F16K 3/12; F16K 31/122

[52] U.S. Cl. .................. 137/240; 60/404; 91/463; 134/166 C; 251/62; 251/195; 251/214; 251/327; 251/328; 277/160

[58] Field of Search .................. 137/240; 251/62, 63.4, 251/63.5, 63.6, 203, 204, 214, 326, 327, 328, 193, 195; 277/160; 60/404; 91/443, 463; 134/166 C

[56] References Cited

U.S. PATENT DOCUMENTS

| 367,207 | 7/1887 | Hughes | 277/160 |
|---|---|---|---|
| 2,630,293 | 3/1953 | Smith | 137/240 |
| 2,834,571 | 5/1958 | Hollander | 251/328 |
| 2,974,637 | 3/1961 | Holmes et al. | 91/443 |
| 3,133,554 | 5/1964 | Joebken | 137/240 |
| 3,225,544 | 12/1965 | Lemley | 60/404 |
| 3,570,510 | 3/1971 | Tsutsumi | 137/240 |
| 3,605,789 | 9/1971 | Graham | 137/240 |
| 3,918,471 | 11/1975 | Bedner | 137/240 |
| 4,174,728 | 11/1979 | Usnick et al. | 137/240 |
| 4,292,992 | 10/1981 | Bhide' | 137/240 |

Primary Examiner—George L. Walton
Attorney, Agent, or Firm—Seidel, Gonda, Goldhammer & Panitch

[57] ABSTRACT

A gate valve having a top inlet and bottom outlet is provided with a horizontally disposed head slidable between closed and open positions. The valve body includes a seat concentric with an inlet passage and adapted to cooperate with a sealing surface on the head. An annular sleeve is provided within the inlet passage with one end of the sleeve being in contact with the sealing surface on the head. The sleeve and seat cooperate with the valve body and head to define an annular space. A means is provided to pressurize the space immediately prior to contact between the head and the seat. The head is biased to a closed position in the event of power failure. The valve is particularly designed for controlling downward flow of high temperature particulate material under high pressure.

12 Claims, 7 Drawing Figures

HIGH TEMPERATURE, HIGH PRESSURE VALVE

BACKGROUND

Abrasive dust particles such as fly ash, catalysts, particles for fluid bed applications, etc., are difficult to control when such particles are at elevated pressures such as 105 psi and at elevated temperatures from 400° F. to 1600° F. Expansion and contraction of the metal materials while at the same time providing a metal to metal seating action without shock create difficult problems. The abrasive particles tend to interfere with attainment of a bubble tight seal between the head and the seat.

The valve of the present invention is a solution to the above and other problems associated with high temperature, high pressure valves.

SUMMARY OF THE INVENTION

The gate valve of the present invention includes a body having an inlet at the top and an outlet at the bottom. The inlet communicates with an inlet passage. The outlet communicates with an outlet passage. The passages communicate with a chamber therebetween. A seat is provided in the chamber and concentric with the inlet passage. An annular wedge is supported within the chamber opposite said seat. A valve head is provided with a seating face adjacent said seat for contact therewith in a closed position. An opposite surface of said head is angled and in contact with said wedge.

A motor means is provided for reciprocating said head between open and closed positions. Said head is cammed against said seat by said wedge. A sleeve is provided in the inlet passage with one end contacting the seating surface on the head. The sleeve outer diameter and the seat inner diameter cooperate with the body and head to define an annular space. Said chamber includes a channel communicating with an end face of the head and with said outlet passage. A means is provided for introducing pressurized gas into said space for cleaning the head and seat just prior to contact therebetween. Any particles which tend to interfere with a good metal to metal contact between the head and seat are blown radially outward into said chamber.

It is an object of the present invention to provide a high temperature gate valve for controlling downward flow of abrasive particles.

It is another object of the present invention to provide a gate valve which can handle flow of particles at a temperature range of 400° F. to 1600° F. while being bubble tight.

It is an object of the present invention to provide a high temperature self cleaning gate valve which is biased to a closed position.

Other objects and advantages will appear hereinafter.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
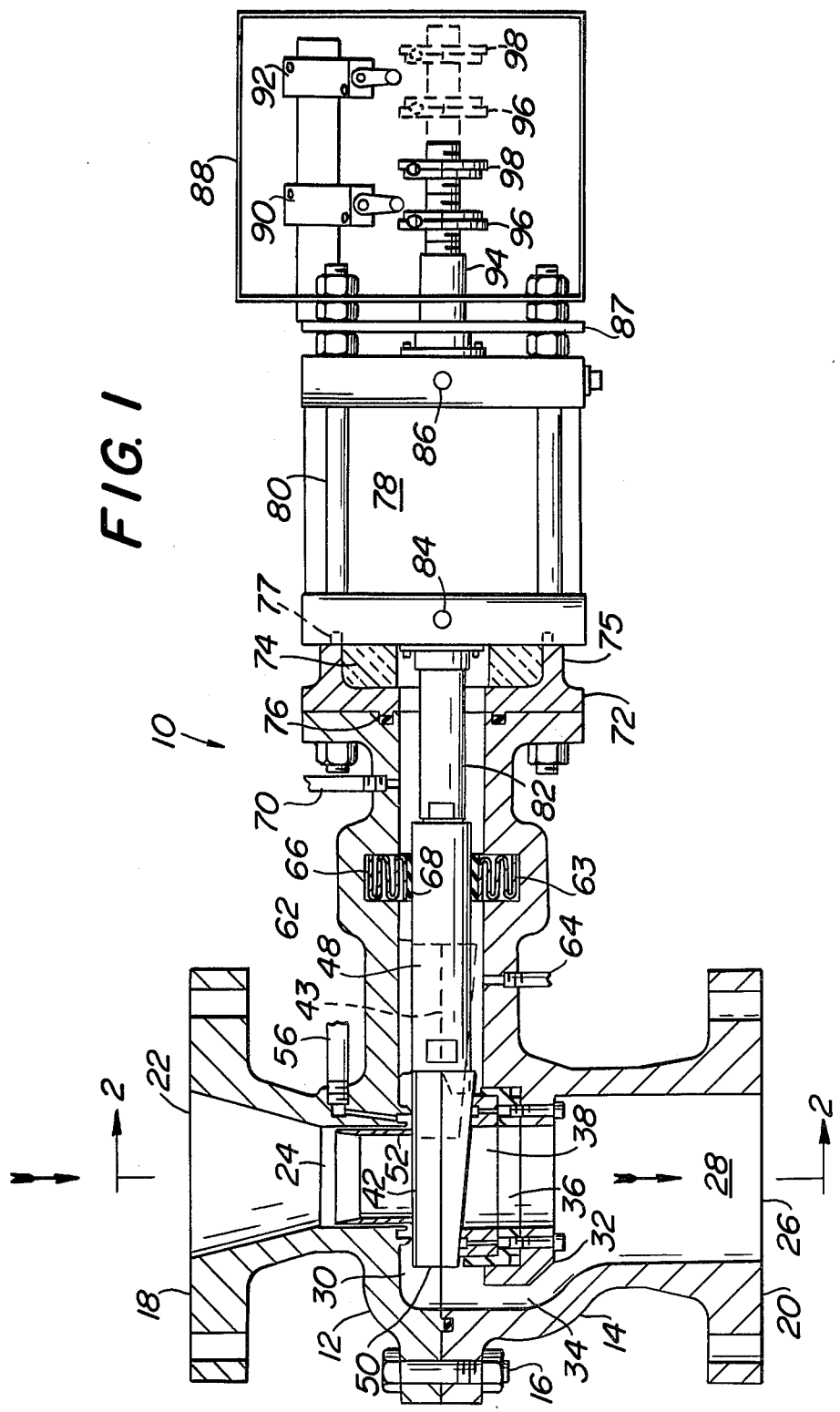
FIG. 1 is a vertical sectional view through a valve in accordance with the present invention.

In FIG. 1 there is shown a valve 10 designed to control the flow of a downwardly directed stream of abrasive particles having a temperature of 400° F. to 1600° F. The body of valve 10 is preferably made in two halves designated 12 and 14 with a seal at the parting line. The halves 12 and 14 are bolted together in any suitable manner such as by fasteners 16. The body halves 12 and 14 preferably made from carbon steel when the valve 10 is used for controlling a flowing stream whose temperature is at the low end of said range and is preferably made from a high chrome steel such as A351-CF8M when the flowing stream has a temperature at the high end of said range.

The valve body half 12 has a flange 18 at its top end and body half 14 has a flange 20 at its bottom end. At the top end of the valve body, there is provided an inlet 22 communicating with an inlet passage 24. Passage 24 preferably tapers inwardly and then is of constant diameter. At its bottom end, the valve body has an outlet 26 communicating with an outlet passage 28. Passages 24 and 28 are concentric and communicate with a chamber 30 therebetween within the valve body. Body half 14 has an integral wall 32 disposed within chamber 30. Wall 32 has a flow passage therethrough and concentric with outlet passage 28. Chamber 30 is in direct communication with outlet passage 28 by way of a downwardly extending channel 34.

A mounting ring 36 is bolted to wall 32. An annular wedge 38 is supported by and surrounded by ring 36. Wedge 38 is preferably made from a high temperature resistant material such as sintered carbon. The upper surface of wedge 38 is angled as shown in FIG. 1.

Figure 2:
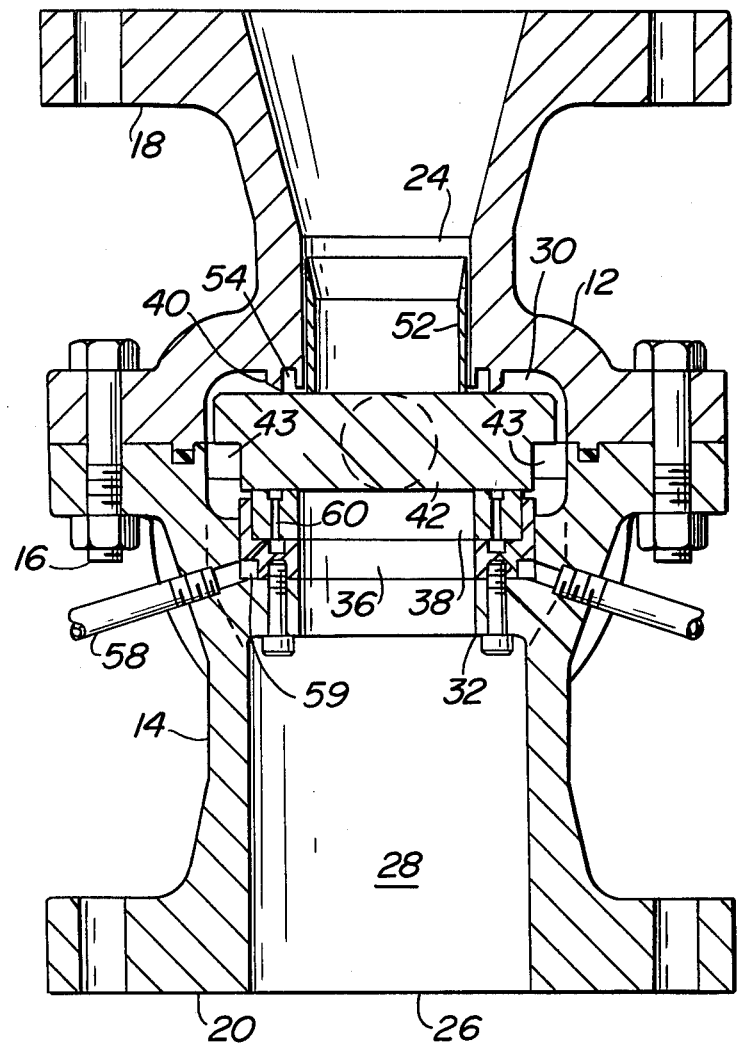
FIG. 2 is a sectional view taken along the line 2—2 in FIG. 1 but on an enlarged scale.
Figure 3:
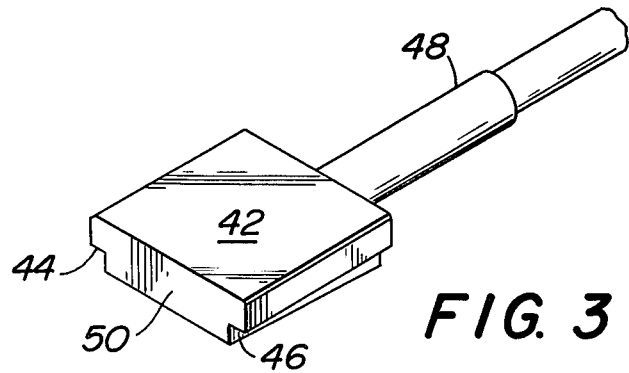
FIG. 3 is a front perspective view of the valve head.

As shown more clearly in FIG. 2, an annular projection 40 extends into chamber 30 from the body half 12 toward wedge 36. Projection 40 surrounds the inlet passage 24. The terminal end of projection 40 is tapered toward its end face which is the valve seat. A gate valve head 42 has a sealing surface on its upper face for contact with the valve seat. Head 42 has longitudinally extending shoulders 44, 46 as shown more clearly in FIG. 3 for contact with the upper surface of support flanges 43 on body half 14 and shown in phantom in FIG. 1. One end of an actuator rod 48 is connected to one end face of head 42. The face at the opposite end of head 42 is designated 50. As shown in FIG. 1, end face 50 is exposed to chamber 30 and channel 34.

A metal sleeve 52 is slidable in passage 24. The lower end of sleeve 52 rests on head 42 in the open and closed positions of head 42. Sleeve 42 cooperates with projection 40, head 42, and body half 12 to define an annular space 54. See FIG. 2. A pair of conduits 56 (only one shown in FIG. 1) each communicate with space 54 by way of a passage in body half 12 for introducing a pressurized gas such as air into space 54 as a function of the location of head 42. Thus, pressurized gas will be introduced from conduits 56 into space 54 just prior to the time when head 42 reaches a closed position as described hereinafter. A pair of conduits 58 are connected to annular space 59 and to passages in body half 14 as shown in FIG. 2. Pressurized gas such as air will be introduced to axial passages 60 in the wedge 38 as described hereinafter.

The head 42 is shown in FIG. 1 in its closed position. The head 42 can be retracted horizontally into bonnet 62 to an open position. The open position of head 42 is shown in phantom lines in FIG. 1. A conduit 64 is connected to bonnet 62 for introducing a pressurized gas such as air into the space surrounding rod 48.

Bonnet 62 is provided with a groove 63 on its inner surface and surrounding the rod 48. A S-shaped A 351-CF8M steel spring 66 is disposed in groove 63 and extends radially inwardly to a sleeve 68. Sleeve 68 is in sliding contact with the rod 48. Sleeve 68 is preferably made from a high temperature resistant material such as sintered carbon. The S-shape of spring 66 provides maximum surface area and accommodates any cocking of the rod 48. A conduit 70 communicates with the bonnet 62 between grooves 63 and the end face of the bonnet. The end face of the bonnet 62 contains an annular seal 76 disposed in a groove. Seal 76 contacts an annular projection on a support 72. Support 72 contains a heat barrier ring 74 surrounded by the axially extending flange 75.

Flange 75 on support 72 engages a header at one end of a cylinder 78 with minimum surface contact with minimum heat transfer. Flange 75 also contacts a high temperature high pressure seal 77 which is disposed in a groove on cylinder 78. Bolts 80 couple cylinder 72 to a flange at the free end of bonnet 62. A piston rod 82 extends from a piston with cylinder 78 and is connected to one end of rod 48 in any convenient manner. A sensor 84 for an indicator is provided on the header at one end of cylinder 78 to indicate the closed position of head 42. A similar sensor 86 is provided at the other end of the cylinder 78 to indicate the open position of head 42. The sensors may be connected to a mechanical indicator or to an electrical indicator such as a light.

A housing 88, having a door not shown, is bolted to a spacer plate 87. Plate 87 is mounted on the header at one end of cylinder 78. A pair of limit switches 90, 92 are mounted within housing 88. An extension rod 94 extends from the piston in cylinder 78 and is coaxial with piston rod 82. Rod 94 has switch cams 96, 98 threadedly connected thereto so as to be accurately adjustable along the length of rod 94. Cam 96 is adapted to actuate switch 90 as it moves in one direction. Cam 98 is adapted to actuate switch 92 as it moves in opposite directions.

Figure 4:
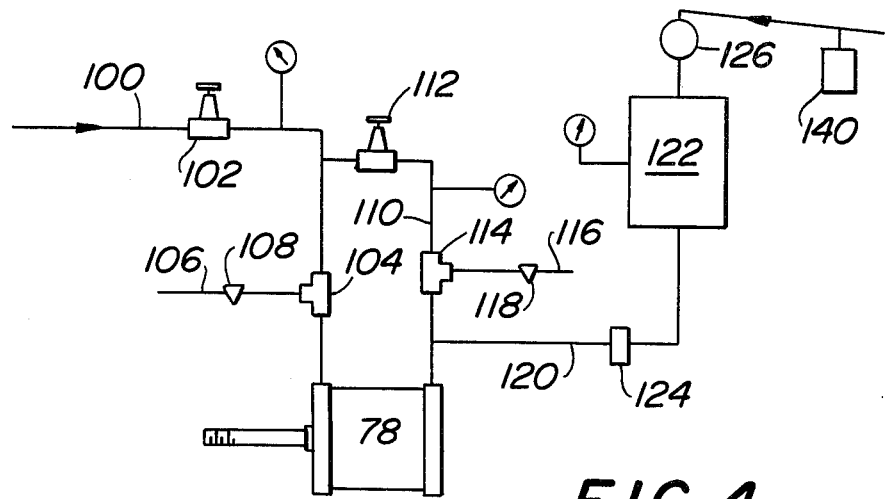
FIG. 4 is a diagrammatic illustration of pneumatic circuitry associated with the motor means for reciprocating the valve head.

In FIG. 4 there is shown circuitry for operating cylinder 78 and for biasing head 42 to a closed position in the event of an electrical or pneumatic power failure. Air at a pressure such as 90 psi is supplied by conduit 100. Conduit 100 contains a constant outlet pressure regulator 102. Conduit 100 is connected to one end of cylinder 78 for introducing air thereinto for causing valve head 42 to move to an open position. Conduit 100 contains a supply and exhaust valve such as a three way solenoid valve 104 at a location between cylinder 78 and regulator 102. The exhaust conduit 106 from valve 104 contains a choke 108. Choke 108 is preferably of the type so as to be manually adjustable for controlling the closing time for head 42 as it moves from an open position to a closed position.

A conduit 110 has one end connected to conduit 100 at a location between regulator 102 and valve 104. Conduit 110 has its other end connected to cylinder 78. Conduit 110 has a constant outlet pressure regulator 112 which is set lower than the setting of regulator 102. With regulator 102 set at a pressure such as 68 psi, regulator 112 may be set at a pressure such as 46 psi. A supply and exhaust valve such as three way solenoid valve 114 is provided in conduit 110 at a location between the regulator 112 and the cylinder 78. The exhaust conduit 116 from valve 114 contains a choke 118. Choke 118 is preferably of the manually adjustable type for controlling the opening time for head 42 as it moves from a closed position to an open position. If choke 108 is set to permit cylinder 78 to exhaust in 5.5 seconds, choke 118 may be set to exhaust cylinder 78 in 2 seconds. Thus, head 42 opens at a rate of speed which is at least 2.5 times as fast as its closing speed.

A conduit 120 has one end connected to conduit 110 between valve 114 and cylinder 78. The other end of conduit 120 is connected to an accumulator 122. Conduit 120 is provided with a normally open valve 124 such as a solenoid valve held closed by a source of electrical potential. Accumulator 122 may be pressurized at a pressure such as 85 psi by way of a conduit containing a check valve 126. In the event of an electrical power failure, valve 124 will open and permit the pressure from accumulator 122 to move the piston in cylinder 78 to a position wherein head 42 is closed against the valve seat. At the same time, valve 104-114 will be in an exhaust position due to the electrical power failure.

Figure 5:
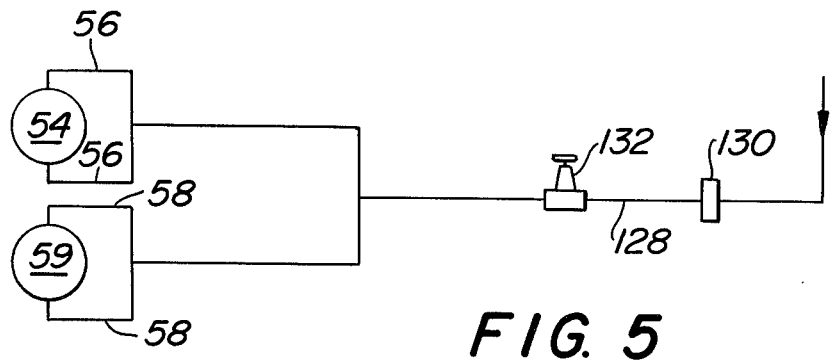
FIGS. 5–7 are schematic circuitry diagrams associated with cleaning air.

Referring to FIG. 5, a conduit 128 is connected to a source of plant air and is connected to the conduits 56, 58. Conduit 128 includes a solenoid operated valve 130 upstream from a constant outlet pressure regulator 132. Valve 130 is normally closed and is controlled by switch 90. Cam 96 is preferably adjusted to a position so as to trip switch 90 when the valve head 42 is 1/16 of an inch from seating against the valve seat. Valve 130 remains open only for the short period of time that cam 96 is in contact with switch 90 so that approximately 1/10 of a cubic foot of air at about 115 psi cleans the opposite faces of the head 42, the valve seat, and the upper surface of the wedge 38. The air escapes by way of chamber 30 and channel 34 downstream to the outlet passage 28. Switch 90 is a single pole switch whereby it is only tripped when the cam 96 moves from right to left in FIG. 1.

Figure 6:
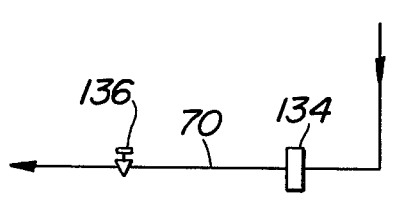
Figure 7:
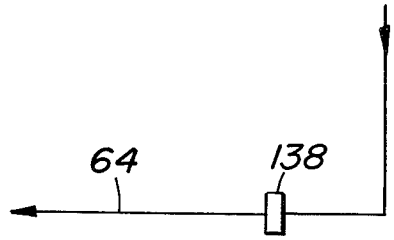

As shown more clearly in FIG. 6, conduit 70 has a normally closed solenoid valve 134 in series with a manually adjustable needle valve 136. Whenever the valve head 42 is in an open position, and switch 92 has been tripped by cam 98 in a counterclockwise direction in FIG. 1, valve 134 is open while valve 130 opens and then closes. Air under line pressure such as 115 psi is constantly bled through conduit 70 into the bonnet 62 to pressurize the interior of the bonnet to the right of spring 66 in FIG. 1. Any particles which enter into the bonnet 62 are blown out by a short shot of air from conduit 64.

Operation

Assume that valve 10 is closed as shown in FIG. 1. Head 42 is moved to the open position shown in phantom in FIG. 1 when it is desired to open the valve 10. Head 42 is moved by causing valve 104 to open with valve 114 in its exhaust position. As the piston in cylinder 78 moves, cam 98 trips switch 92 to open valve 134 to bleed air into bonnet 62 from conduit 70. The stream of particles flows downwardly from inlet 22 to outlet 26 as shown by the arrows. Minimum particles enter the right hand end of bonnet 62 due to the air pressure therein and minimum heat is transferred to the cylinder 78 by the bonnet 62 as explained above. During the short period of time that switch 92 is cammed counter clockwise in FIG. 1 by cam 98, valve 138 also opens whereby a shot of air from conduit 64 blows particles out of bonnet 62 and into chamber 30.

When it is desired to close valve 10, valve 104 is vented to its exhaust position and valve 114 is opened. Piston rod 82 moves from right to left in FIG. 1 and end face 50 on the head 42 pushes a "slug" of particles into channel 34. Such particles are discharged through the outlet 26. When the sealing surface on head 42 is spaced by a gap of about 1/16 of an inch from the valve seat, cam 96 trips switch 90 to open valve 130. Pressurized air enters annular spaces 54 and 59 to clean the interface between the head 42 and the valve seat as well as between the head 42 and the wedge 38. The head 42 contacts the valve seat and is held as a result of contact with the wedge 38 to form a bubble tight seal. Valve 130 closes to shut off the cleaning air. Valve 134 closes due to contact between cam 98 and switch 92 to shut off the air bleed in conduit 70.

Closing of the valve in the event of an electrical power failure is the same as described above except as follows. Valve 114 remains in a closed position instead of moving to a vent position. Normally closed valve 124 is opened. Pressurized air from accumulator 122 enters the cylinder 78 and moves the valve head 42 to a closed position.

If there is a failure of air pressure supplied to the accumulator 122, this is detected by switch 140 which preferably trips the electrical circuit. If the electrical circuit is tripped, valve 10 closes as described above.

A valve made in accordance with the present invention for handling up to 80,000 lbs per hour has walls for the housing at least one inch thick, weights over 1600 lbs, outlet passage 28 has a diameter of 7½ inches, etc. In order to assure metal deformation of the valve seat within the elastic range and minimize seat wear, the size or amount of particles remaining on the seal after air blast should be less than 0.0001 inches in diameter or height. The air blast which is accurately timed and of limited volume (such as 0.1 cubic feet) will provide an air velocity over the head and seat of about 2500 feet per minute.

The present invention may be embodied in other specific forms without departing from the spirit or essential attributes thereof and, accordingly, reference should be made to the appended claims, rather than to the foregoing specification, as indicating the scope of the invention.

I claim:

1. A gate valve comprising a body having a top inlet connected to an inlet passage and a bottom outlet connected to an outlet passage, said passages communicating with a chamber therebetween, a valve seat concentric with said inlet passage, an annular wedge opposite said seat, an imperforate valve head having a seating face adjacent said seat for contact therewith in a closed position, an opposite surface of said head being angled and in contact with said wedge, motor means for reciprocating said head between open and closed positions, a sleeve in said inlet passage with one end thereof contacting said seating surface of said head, said sleeve outer diameter and said seat inner diameter cooperating with the body and head seating surface to define an annular space, means to introduce a pressurized gas into said space for cleaning the interface between said head seating surface and seat just prior to contact between said head seating surface and seat, and a channel providing open communication between an end face of said head and said outlet.

2. A gate valve in accordance with claim 1 wherein said motor means reciprocates said head from a closed position to an open position substantially faster than from the open position to the closed position.

3. A gate valve in accordance with claim 1 including means for causing said head to move from an open position to a closed position in the event of an electrical or pneumatic power failure.

4. A gate valve in accordance with claim 1 including a bonnet connected to said body, said motor means retracting said head into said bonnet when the head is in an open position, and means for bleeding a pressurized gas into an isolated portion of the bonnet.

5. Apparatus in accordance with claim 4 including a spring seal surrounding an actuator for said head at a location within said bonnet.

6. A gate valve for controlling flow of particles comprising a body having a top inlet connected to an inlet passage and a bottom outlet connected to an outlet passage, said passages communicating with a chamber therebetween, a valve seat in said chamber and concentric with said inlet, an annular wedge in said chamber and opposite said seat, a valve head having a seating face adjacent said seat for contact therewith in a closed position, an opposite surface of said head being angled and in contact with said wedge, motor means connected to said head for reciprocating said head between open and closed positions, a bonnet connected to said body, said motor means retracting said head into said bonnet when the head is in an open position, means cooperating with the body and head to define an annular space concentric with and radially inward of the seat, means cooperating with said head and wedge to define a second annular space adjacent said head surface opposite said seating face, means to introduce a pressurized gas into said spaces for cleaning the interface between said head and seat and wedge just prior to contact between said head and seat, and said chamber being in open communication with said outlet.

7. A gate valve in accordance with claim 6 wherein said motor means reciprocates said head from a closed position to an open position substantially faster than from the open position to the closed position.

8. A gate valve in accordance with claim 6 including means for causing said head to move from an open position to a closed position in the event of an electrical power failure.

9. Apparatus in accordance with claim 6 including a spring biasing a seal radially inwardly, said seal surrounding an actuator for said head at a location within said bonnet, said spring being exposed to the interior of said bonnet.

10. Apparatus in accordance with claim 9 wherein said spring has a S-shape for maximizing surface area exposed to the interior of said bonnet.

11. Apparatus in accordance with claim 6 wherein said chamber is in open communication with said outlet by way of a channel, said channel being exposed to an end face of said wedge when the wedge is in a closed position.

12. Apparatus in accordance with claim 1 wherein said sleeve is slideable in said inlet passage and is disposed radially inwardly from said seat.

* * * * *